United States Patent Office 3,301,831
Patented Jan. 31, 1967

3,301,831
PROCESS FOR THE PREPARATION OF SULFUROUS CONDENSATION PRODUCTS WHICH ARE INSOLUBLE IN WATER
Ludwig Orthner, Frankfurt am Main, Karl Horst, Hofheim, Taunus, and Heino Wellens, Frankfurt am Main, Germany, assignors to Farbwerke Hoechst Aktiengesellschaft vormals Meister Lucius & Bruning, Frankfurt am Main, Germany, a corporation of Germany
No Drawing. Filed May 24, 1962, Ser. No. 197,264
Claims priority, application Germany, May 27, 1961,
F 34,033
6 Claims. (Cl. 260—79.1)

It is known to prepare alkylmono and dithiosulfates by reacting amino compounds which contain halogen or epoxy groups with sodium thiosulfate.

It is, furthermore, known that alkylmono- and dithiosulfates can be converted into disulfides that are mostly insoluble in water by means of various agents, for example, hydrogen peroxide, alkali metal hydroxide solution or alkali metal disulfide.

Now we have found that condensates being insoluble in water and containing polysulfide bridges and possessing valuable properties, can be prepared by reacting nitrogen-free organic compounds that do not possess dyestuff properties (A) and contain in the molecule more than two exchangeable halogen atoms or groups acting in an analogous manner, such as, for example, sulfuric acid ester groups, with water-soluble thiosulfates (B) to form aryl or alkylthiosulfonates, so-called "Bunte"-salts, (C) and by converting the latter into a state in which they are insoluble in water according to the methods of linkage known for "Bunte"-salts while polysulfide bridges are formed (cf. Houben-Weyl "Methoden der organischen Chemie," vl. IX, pages 67, 68 and page 18 note 2).

As organic compounds (A) which according to the process of the present invention are reacted with water-soluble thiosulfates there enter into consideration such compounds as contain at least 3 to about 25, preferably 3–15 groups that are reactive with thiosulfate and that are attached to an aromatic or aliphatic radical in the molecule. The groups which are reactive with thiosulfate are first of all the following radicals:

—O—CH₂—X
—O—CH₂—CH—CH₂—X
          |
          OH
—O—CO—(CH₂)ₙ—X
—O—SO₂R wherein X represents a halogen atom, especially chlorine, bromine or iodine and R stands for an alkyl radical having from 1 to 6 carbon atoms, an aryl radical, especially the phenyl radical, or an alkyl phenyl radical having from 1–3 aliphatic carbon atoms, especially the toluyl radical, and n represents one of the integers 1–4. There may also be used aromatic compounds which contain the radical —CH₂—X bound to xylene or naphthalene.

For the preparation of the compounds (A) aliphatic or aromatic compounds containing 3–25, preferably 3–15 hydroxyl groups in the molecule can be reacted with epihalohydrine, halogen carboxylic acids, aliphatic or aromatic sulfo acids or with formaldehyde and hydrogen halide in the presence of acid or alkaline condensing agents and at temperatures between 5 and 120° C. As starting materials containing hydroxyl groups there may substantially be used two groups of compounds:

(1) Aliphatic polyalcohols containing at least 3, preferably 3–15 free hydroxyl groups and having about 3–25 carbon atoms. Under this category come also polyesters having at least 3 free hydroxyl groups from aliphatic or aromatic polycarboxylic acids, preferably dicarboxylic acids and polyalcohols. As suitable polyalcohols there may be mentioned for example: Glycerine, polyglycerines, hexane triol, erythrites, pentites, hexites and the polyesters of those alcohols with oxalic acid, malonic acid, succinic acid, adipic acid, phthalic acid, isophthalic acid and terephthalic acid.

(2) Condensation products prepared in an acid medium from aliphatic aldehydes and compounds containing phenolic hydroxyl groups, so called novolacquers. The preparation of those novolacquers can be carried out according to known methods, for example, according to the process of U.S. Patent No. 2,330,217. According to this process phenols such as, for example, phenol, cresol, α- or β-naphthol, alkyl phenols having from 1 to 18 carbon atoms in the alkyl chain, halogen phenols and the like are condensed in the acid medium with aliphatic aldehydes, especially formaldehyde. Aromatic condensation products from aromatic hydrocarbons such as, for example, xylene, naphthalene and the like that are free from hydroxyl groups with formaldehyde belong to these novolacquers. By reaction with formaldehyde and hydrogen halide halogen methyl ether groups can be introduced into those compounds.

As water-soluble thiosulfates there are used first of all alkali metal thiosulfates, especially sodium and potassium thiosulfate as well as ammonium thiosulfate.

For the reaction with the water-soluble thiosulfates the organic compounds (A), which can also be used as mixtures, are dissolved in water or in organic solvents that are miscible with water, such as, for example, methanol, ethanol, isopropanol, dimethylformamide, dimethylsulfoxide, acetone, dioxane, ethylene glycol monomethyl ether or the corresponding ethyl, propyl or butyl ethers or phosphoric acid trimethyl amide or mixtures of said solvents and mixed with the aqueous solution of a thiosulfate, heated—if desired—and thus reacted totally or partially to form "Bunte"-poly-salts (C). During the reaction at least 3 thiosulfate groups are to be introduced per molecule of the compound (A). For the reaction the thiosulfonates are added in the theoretical quantity required for the introduction of the desired number of thiosulfate groups or in a small excess as aqueous solution to the solution of the organic compounds containing reactive groups (A) and stirred at about 0–110° C. until the reaction is terminated. Generally, the reaction is terminated after about 1–10 hours.

The reaction temperature to be observed especially depends on the reactivity of the groups reacting with the thiosulfate. With halogen methyl ethers, for example, it is necessary to operate at low temperatures, preferably at 0–20° C. in order to avoid an untimely hydrolysis, whereas, for example, the compounds obtained by the reaction with epihalohydrines and the compounds which contain halogenmethyl groups attached to the aromatic nucleus are advantageously reacted at higher temperatures, preferably at 60–110° C. In some cases, for example, with the compounds obtained by reaction with epihalohydrines it can be advantageous to start the reaction by the addition of alkali metal at a weakly alkaline pH-value, for example at pH 8–9, and to continually neutralize the alkali metal hydroxide set free in the course of the reaction later on by the addition of acid. The "Bunte"-salts are soluble in water or alcohol. Their solubility can be varied by changing the amount of the thiosulfate groups introduced.

The "Bunte"-polysalts (C) obtained in aqueous or water-containing solution are condensed and cross-linked preferably subsequently without isolation mostly in aqueous or alcoholic solution at a pH of at least 8 to about 14 and at temperatures ranging from 0 to about 150° C. with the formation of polysulfide bridges in such a way that novel substances are formed which are insoluble in water possessing different properties according to the kind of the starting material used. Depending on the kind of the starting material and the number of the introduced thiosulfate groups there may also be obtained substances that are still soluble in alcohol or other organic solvents or products that are insoluble in all solvents. The temperature to be observed during the condensation of the "Bunte"-salts depends first of all on the choice of the alkaline condensing agent used.

As alkaline condensing agents there may be used, for example: alkali metal, ammonium and alkaline earth metal hydroxides; alkali metal carbonates and bicarbonates; ammonium and alkali metal sulfides, hydrogensulfides and polysulfides; alkali metal salts of weak organic acids, such as, for example, sodium or potassium acetate and the sodium or potassium salt of trichloroacetic acid, furthermore, organic bases as for example, alkyl amine and the corresponding quaternary ammonium compounds, alkanolamines, basic heterocyclic compounds such as for example, piperidine, piperazine, morpholine and pyridine. There may also be used mixtures of different alkaline condensing agents.

In case only weakly basic substances are used, for example, diethanol amine, morpholine or alkali metal carbonates, the condensation is preferably carried out at temperatures of 100° C. or above, whereas with the use of strong alkalies, such as for example, alkali metal hydroxide solution, generally temperatures of 40 to 80° C. suffice.

The condensation of the "Bunte"-salts can be accelerated by the addition of reducing substances, such as, for example, alkali metal sulfites or alkali metal dithionites. When alkali metal sulfides and hydrogensulfides or polysulfides are used as alkaline condensing agents, condensation commences very quickly at temperatures below 40° C. The condensing action of alkali metal carbonates, for example, can be accelerated by adding thiourea.

The condensation products obtained according to the process of the present invention and containing polysulfide bridges are suitable for example, for the preparation of plastic or rubber-elastic masses used, for example, as insulating material in electro-industry and for the finishing of textiles.

The "Bunte"-salts prepared according to the process of the present invention which are not yet condensed (C) can be used with special advantage as binding agents for the fixing of pigments on textile materials and foils. In such a process the "Bunte"-poly-salts (C) are added to the preparations, for example, to the printing pastes or padding liquors which contain pigments and—if desired— further usual auxiliary agents, for example thickening agents. The printing pastes or padding liquors may also contain polyalkylene polyamides and possibly alkali metal sulfides, hydrogensulfides or polysulfides, thiourea, compounds containing organic mercapto groups, organic disulfide compounds or derivatives of thiocarbamic acid. The materials printed or padded with the afore-mentioned preparations are fixed by an alkaline after treatment in the heat, mostly at temperatures of 60–200° C. The fixation by an alkaline after treatment can be carried out, for example, by passing the printed or padded and dried materials through an alkaline bath at 60–100° C. It is, however, also possible to add alkalies or substances forming alkali in the heat, such as sodium bicarbonate or the sodium salt of trichloracetic acid already to the printing pastes or padding liquors. In this case the fixation can be carried out by steaming or dry heating at temperatures ranging from 90 to 200° C.

The following examples serve to illustrate the invention, but they are not intended to limit it thereto:

*Example 1*

(a) 47 grams of phenol, 27 grams of p-cresol and 45 grams of p-hexylphenol were heated for 2½ hours under reflux together with 75 grams of an aqueous formaldehyde solution of 30% strength and 10 cc. of sulfuric acid of 5% strength. Ethanol was added in such a quantity that a homogeneous solution was formed. This solution was neutralized with calcium carbonate, filtered and concentrated to dryness by steaming. The novolacquer so obtained was dissolved in 100 grams of epichlorohydrine and the solution was heated for about 20 hours at 80 to 90° C., while stirring, after having added 1 cc. of potassium hydroxide solution of 40% strength and ½ cc. of sodium-bisulfite solution of 20% strength. After dilution with some acetic acid ethyl ester the solution was filtered and concentrated to dryness in vacuo by steaming at 50° C. maximum. There remained 222 grams of an oily residue which additionally to a little epoxyde oxygen contained about 0.9 mol of bound chlorine.

(b) The oily residue obtained according to (a) was dissolved in 500 cc. of methanol and mixed with a solution of 250 grams of sodium thiosulfate in 170 cc. of water. This mixture was adjusted to pH 9 with sodium hydroxide solution and heated at the boil under reflux. After a short time, during the formation of "Bunte"-salts, sodium hydroxide solution was set free. By continually adding dilute hydrochloric acid the pH value was maintained below 9. After 2½–3 hours the reaction product had become readily water-soluble. The methanol was then almost completely removed by distillation. The "Bunte"-poly-salt was made up with water to 640 grams (= solution of 50% strength) in the heat. 20 grams of the solution thus obtained were mixed with 5 cc. of an aqueous soda solution of 20% strength and abandoned for 30 minutes in a drying chamber heated at 130° C. A hard, completely insoluble, transparent plastic was obtained.

A further sample of 20 grams of the solution was heated with 5 cc. of an aqueous sodium hydroxide solution of 20% strength for 10 minutes at 70° C. First a porous plastic was obtained which contained water and became completely insoluble after being dried.

*Example 2*

From 54 grams of p-cresol, 57 grams of 4,4'-dihydroxydiphenyl dimethyl methane, 45 grams of p-hexylphenol and 75 grams of a formaldehyde solution of 30% strength a novolacquer was prepared according to the prescriptions given in Example 1a which was reacted with 120 grams of epichlorohydrine to form chlorohydroxypropyl ether containing 1.15 mols of bound chlorine. The reaction product was reacted with 325 grams of sodium thiosulfate according to the process described in Example 1b. There were obtained 820 grams of an aqueous solution of "Bunte"-poly-salt of 50% strength.

20 grams of the solution thus obtained were mixed with 5 cc. of an aqueous soda solution of 20% strength and abandoned for 30 minutes in a drying chamber heated at 130° C. A hard, completely insoluble, transparent plastic was obtained.

A further sample of 20 grams of the solution was heated with 5 cc. of an aqueous sodium hydroxide solution of 20% strength for 10 minutes at 70° C. First a porous plastic was obtained which contained water and became completely insoluble after being dried.

*Example 3*

From 47 grams of phenol, 173 grams of p-octadecylphenol and 76 grams of a formaldehyde solution of 30% strength a novolacquer was prepared according to the prescriptions given in Example 1a which was reacted with 100 grams of epichlorohydrine to form the corresponding chlorohydroxypropyl ether containing about 1 mol of bound chlorine. The product obtained was reacted with 165 grams of ammonium thiosulfate according to the process described in Example 1b. After distilling off the methanol and adding 860 cc. of water, the "Bunte"-polysalt was obtained in a viscous solution of 33% strength. 20 grams of this solution were heated with 5 cc. of a sodium sulfide solution of 20% strength ($Na_2S \cdot 9H_2O$) for 5 minutes at 40° C. In this process a plastic, kneadable mass was obtained which was insoluble in water and alcohols and soluble in acetonitrile and, for example, dimethylformamide.

Example 4

100 grams of p-tert. butyl phenol and 48 grams of α-naphthol, 90 grams of an aqueous formaldehyde solution of 30% strength and 10 cc. of sulfuric acid of 10% strength were heated for 5 hours under reflux. After working up the reaction mixture according to the methods indicated in Example 1a there was obtained a novolacquer having an average molecular weight of 6000–6200 and containing 40–42 phenolic OH-groups per molecule. As described in Example 1 this novolacquer was first reacted with 100 grams of epichlorohydrine and subsequently reacted with 250 grams of thiosulfate and worked up. Yield: 1220 grams of an aqueous solution of 30% strength.

20 grams of the solution so obtained were mixed with 2 grams of morpholine and heated for 20 minutes at the boil. A precipitate separated which, after being dried, formed a hard, brittle and transparent plastic.

Example 5

140 grams of the novolacquer prepared according to the process of Example 1a were esterified azeotropically with 100 grams of chloroacetic acid in 400 cc. of chlorobenzene in the presence of 3 grams of p-toluene sulfo acid. After washing with a sodium carbonate solution and water and distilling off the solvent, there were obtained 230 grams of an oily resin which contained 1 mol of bound chlorine. Said resin was dissolved in 500 cc. of methanol and after addition of 260 grams of sodium thiosulfate heated in 150 cc. of water for about 3 hours at the boil under reflux until the reaction product was clearly soluble in water. The precipitated sodium chloride was filtered and the remaining residue was concentrated to dryness in vacuo. The remaining sirup still contained 0.1 to 0.2 mol of unreacted bound chlorine. By dissolving it in 320 cc. of water a "Bunte"-poly-salt solution of 50% strength was obtained.

20 grams of the solution thus obtained were mixed at 20° C. with 3 cc. of a sodium sulfide solution of 10% strength. After some minutes the complete solution solidified, when kneading the substance water separated, and after drying the substance there was obtained a transparent, somewhat flexible plastic.

Example 6

140 grams of the novolacquer prepared according to the process of Example 1a were dissolved in 400 cc. of perchloroethylene. After addition of 30 grams of paraformaldehyde, 40 grams of hydrogen chloride were introduced in the course of 45 minutes while stirring vigorously and cooling at −5° C. to 0° C. Stirring was continued for a further hour at 0° C. to +5° C. and the separated water was removed. The substance obtained was then washed three times with ice-cold water, dried with calcium chloride and freed from the solvent in vacuo. There were obtained about 175 grams of an oily resin which contained about 0.8 mol of chlorine bound as chloromethyl ether. This resin was dissolved in 200 cc. of ice-cold isopropanol and—while stirring vigorously— added dropwise to a solution of 220 grams of sodium thiosulfate in 500 cc. of water maintained at 10° C. The reaction was terminated when the dropwise addition was finished after about 1½ hours. The isopropanol was steamed off in vacuo. 800 grams of a "Bunte"-salt solution of about 32% strength were obtained.

20 cc. of the solution thus obtained were mixed with 5 cc. of an aqueous potassium hydrogen sulfide solution of 10% strength and heated for 10 minutes at 40 to 50° C. The precipitated product was washed and dried. It was an insoluble synthetic resin which was hard in the cold.

Example 7

134 grams of 1,3,5-hexanetriol were dissolved in 500 cc. of dry pyridine, and 195 grams of p-toluene sulfochloride were added thereto portionwise during 2 hours at 0–5° C., while stirring, whereby the temperature was maintained between 0 and 10° C. by cooling with ice/sodium chloride. With the same working method there may also be used 120 grams of methane sulfochloride, 150 grams of propane-1-sulfochloride or 180 grams of benzene sulfochloride instead of toluene sulfochloride. After having finished the addition of sulfochloride, the solution was stirred for a further hour at 10 to 20° C. and then poured on ice. The organic phase was taken up in di-isopropyl ether, dried, and the solvent was distilled off under reduced pressure. 500 grams of hexane-1,3,5-tris-p-toluene sulfonic acid ester were obtained. Said ester was dissolved in 1200 cc. of methanol, mixed with 220 grams of sodium thiosulfate in 150 cc. of water and stirred at 40–60° C. until no turbidity occurred with water. The methyl alcohol was then distilled off and the solution was made up with water to a content of 50% by weight (calculated on sodium hexane-1,3,5-tris-thiosulfonate).

20 cc. of the solution so obtained were stirred for 10 minutes at 40° C. with 5 cc. of an aqueous sodium sulfide solution of 10% strength. A substance precipitated which, after being dried, yielded a hard infusible plastic.

Example 8

166 grams of diglycerine were esterified azeotropically with 440 grams of β-chloropropionic acid in 800 cc. of xylene in the presence of 5 grams of p-toluene sulfo acid. The ester which was washed, dried, freed from the solvent and which contained 3.7 mols of bound chlorine was dissolved in 1.2 liters of ethanol, mixed with 1000 grams of sodium thiosulfate in 800 cc. of water and heated under reflux, while stirring vigorously, until the mixture was clearly water-soluble. The mixture was distilled with a descending cooler until the alcohol was removed, which lasted about 2 hours. A solution of the "Bunte"-tetra-salt of 43% strength was obtained in a yield of 2 kilograms.

20 grams of the solution thus obtained were mixed with 5 cc. of an aqueous soda solution of 20% strength and 5 cc. of an aqueous thiourea solution of 10% strength and maintained for 10 minutes at 90° C. The separated plastic was pasty and dissolved in dimethyl formamide in the heat.

Example 9

268 grams of heptaglycerine (obtained according to Rangier "Comptes Rendus" 187, 345) were esterified azeotropically in 600 cc. of xylene with 470 grams of chloroacetic acid in the presence of 5 grams of p-toluene sulfo acid. The reaction product was filtered, washed first with a soda solution of 10% strength and then with water. The so isolated ester, which contained about 4.3 mols of bound chlorine, was dissolved in 1.5 liter of methanol and—after the addition of 1200 grams of sodium thiosulfate—stirred in 1 liter of water at a temperature of 50–70° C. for so long a time until the reaction product was clearly water-soluble. As described in the second part of Example 8, a sample of the reaction product was heated with an aqueous soda solution and a thiourea solution at 90° C. Thereby a mass precipitated which was insoluble in water and exhibited a horny structure after being dried.

Example 10

420 grams of a polyester from terephthalic acid, glycol and glycerine with 4.1% of OH-groups and a molecular weight of 2500–4000 were dissolved in 1 liter of hot chlorobenzene. After cooling to 20° C., 4 grams of tintetrachloride were cautiously added thereto in spite of precipitates or turbidities which might occur. Starting at a temperature of 30° C., 100 grams of epichlorohydrine were added dropwise and the temperature was kept below 40° C. by cooling. The dropwise addition being terminated, stirring was continued for a further hour at 50° C. The solution which was then clear was washed neutral with a solution of sodium bicarbonate and water and freed from the chlorobenzene in vacuo.

The remaining resin, which contained about 1 mol of bound chlorine, was dissolved in 1200 cc. of ethanol, mixed with 270 grams of sodium thiosulfate in 100 cc. of water, adjusted to pH 10 with sodium hydroxide solution and—while stirring—heated at the boil under reflux. During the reaction, free sodium hydroxide solution was formed after a short time, which was neutralized with dilute hydrochloric acid, so that a pH of 8-9 was always maintained. As soon as the solution was miscible with water without turbidities occurring, the alcohol was distilled off through a descending cooler. After cooling the aqueous residue, two layers were formed; the lower layer, which consisted of salt lye, was removed, whereas the "Bunte"-poly-salt resin was dissolved in water to yield a solution of 40% strength.

20 cc. of the solution so obtained were mixed with 5 cc. of an aqueous potassium hydrogen sulfide solution of 10% strength and heated for 10 minutes at 40 to 50° C. After being washed and dried, the precipitated plastic was a flexible mass, which was not quite so elastic as rubber.

*Example 11*

250 grams of a polyester from adipic acid and 1,3,5-hexanetriol having a molecular weight of about 10.000 and 6.9% of OH-groups in the molecule were reacted, as described in Example 10, first with epichlorohydrine and then with sodium thiosulfate. 20 cc. of the aqueous solution of 30% strength of the "Bunte"-poly-salt obtained as final product were mixed with 5 cc. of an aqueous potassium sulfide solution of 10% strength and heated for 10 minutes at 40–50° C. After being washed and dried the precipitated mass yielded a hard but elastic plastic.

We claim:

1. A process for the preparation of a water-insoluble condensate containing polysulfide bridges which comprises reacting a novolacquer (A) which contains at least 3 groups capable of reacting with thiosulfate with (B) a member selected from the group consisting of water-soluble ammonium and alkali metal thiosulfates to form (C) a salt selected from the group consisting of aryl and alkyl thiosulfuric acid, and treating said salt with an alkaline condensing agent to give said water-insoluble condensate.

2. A process as defined in claim 1 wherein a solution of said novolacquer (A) in a medium selected from the group consisting of water, a water-miscible organic solvent and a water-containing mixture of an organic solvent is mixed with an aqueous solution of said thiosulfate (B) while stirring at 0–110° C., and the salt (C) obtained is condensed with the addition of said alkaline condensing agent at pH 8–14 at a temperature of 0–150° C.

3. A process as defined in claim 1 wherein a novolacquer (A) is used which contains, as groups capable of reacting with thiosulfate, members selected from the group consisting of

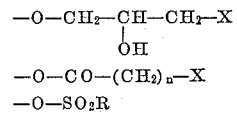

—O—CO—(CH$_2$)$_n$—X

—O—SO$_2$R wherein X represents a halogen atom, R represents a member selected from the group consisting of an alkyl radical having from 1 to 6 carbon atoms, a phenyl radical and an alkyl phenyl radical having from 1 to 3 aliphatic carbon atoms, and $n$ represents one of the integers 1 to 4.

4. A process as defined in claim 1 wherein said novolacquer (A) contains 3 to 25 groups capable of reacting with thiosulfate.

5. A process as defined in claim 1 wherein said novolacquer (A) is obtained by reacting a novolacquer containing 3 to 25 phenolic hydroxyl groups in the molecule with a member selected from the group consisting of epihalohydrine, halogeno-carboxylic acids, aliphatic sulfo-acids and aromatic sulfo-acids in the presence of a condensing agent.

6. A process as defined in claim 1 wherein the treatment of said salt (C) is accelerated by adding a reducing agent.

References Cited by the Examiner

UNITED STATES PATENTS 2,875,182  2/1959  Fettes et al. _____ 260—79.1
2,925,362  2/1960  Fettes et al. _____ 260—79.1

FOREIGN PATENTS 412,349  6/1934  Great Britain.

JOSEPH L. SCHOFER, *Primary Examiner.*

WILLIAM H. SHORT, *Examiner.*

M. P. HENDRICKSON, D. K. DENENBERG,
*Assistant Examiners.*